Sept. 26, 1950      B. G. COPPING      2,523,498
AUTOMATIC THERMOSTATIC REGISTER
Filed May 8, 1948      3 Sheets-Sheet 1
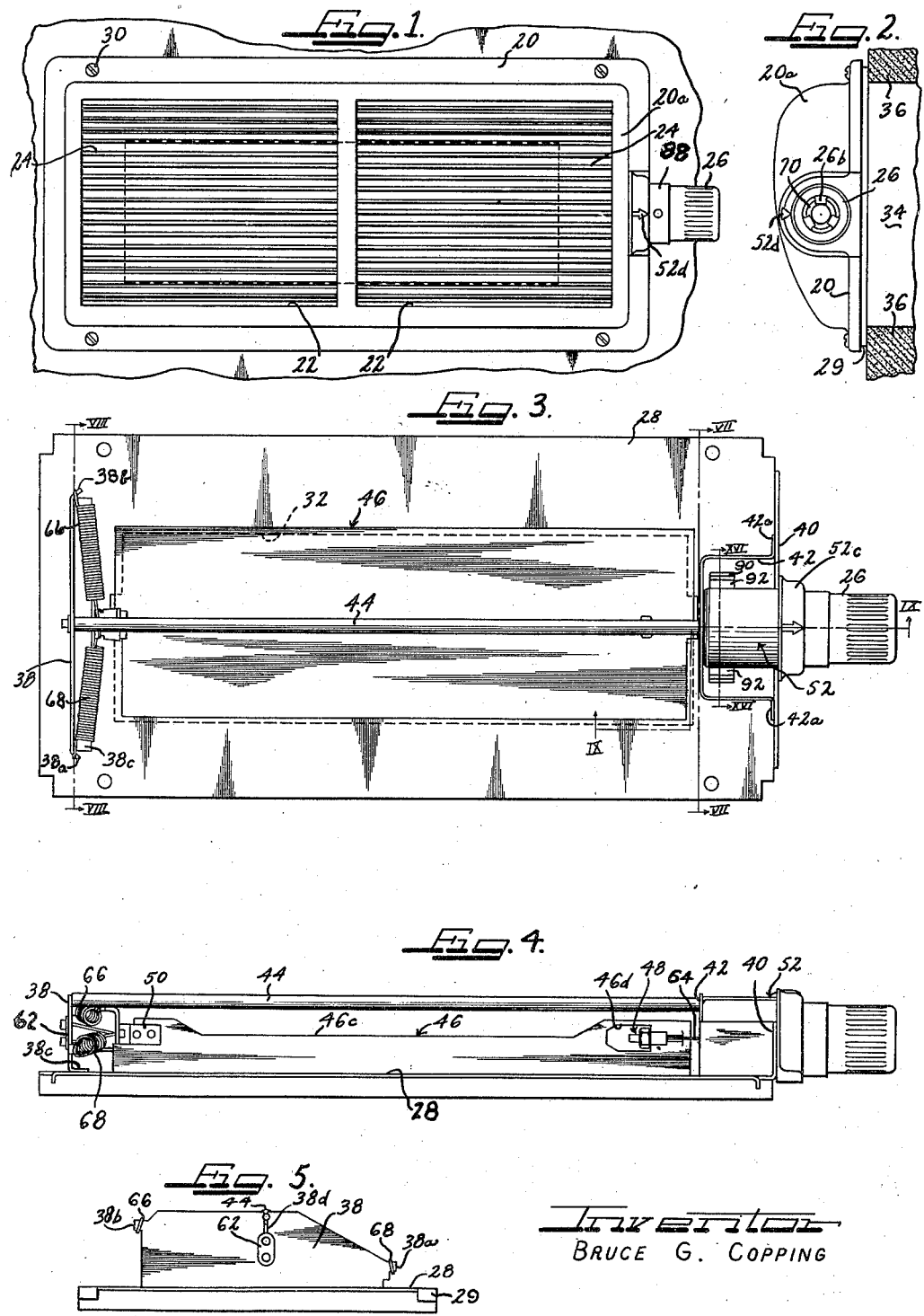
Inventor
BRUCE G. COPPING

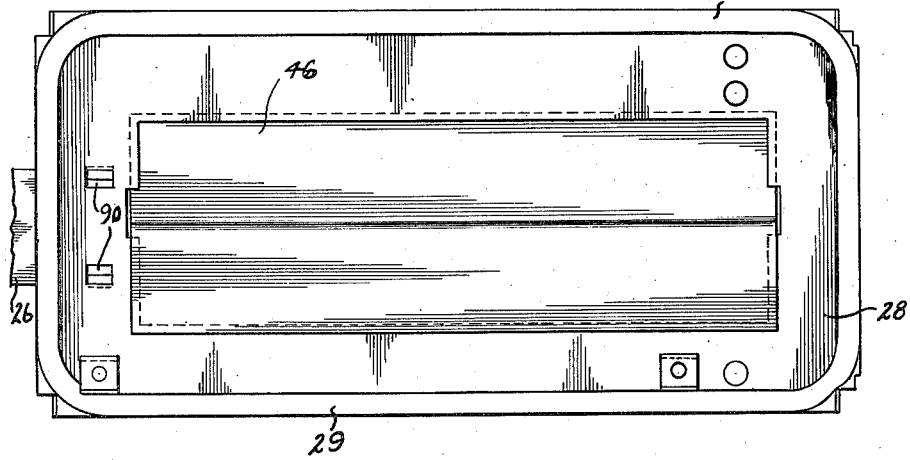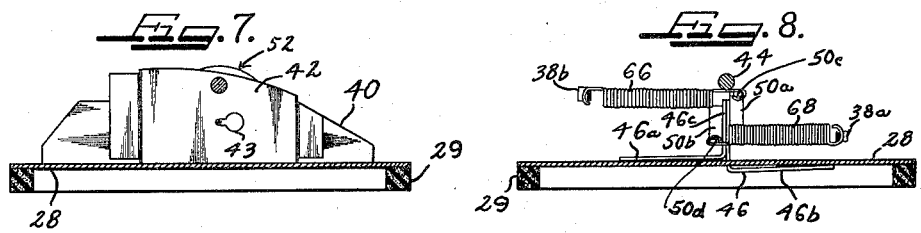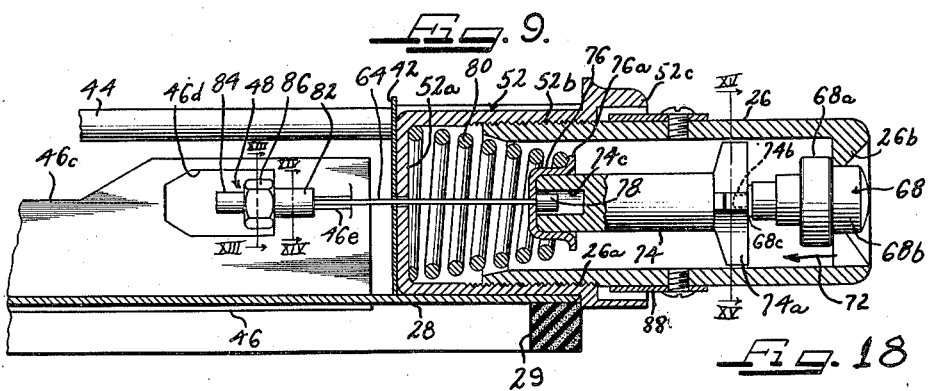

Sept. 26, 1950 B. G. COPPING 2,523,498
AUTOMATIC THERMOSTATIC REGISTER
Filed May 8, 1948 3 Sheets-Sheet 3
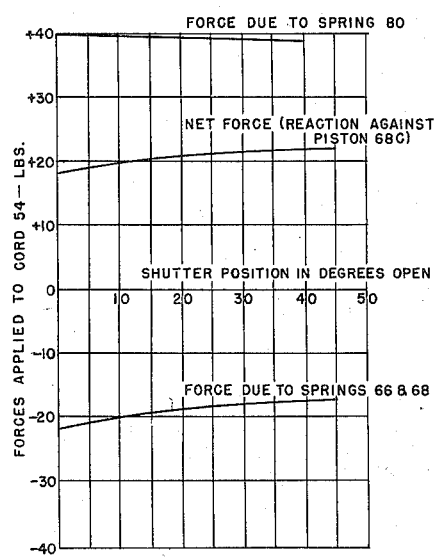
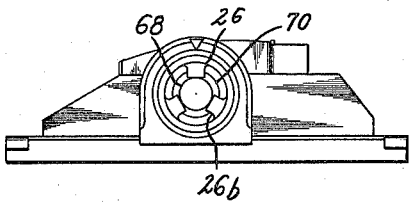
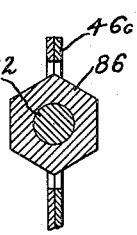
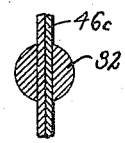
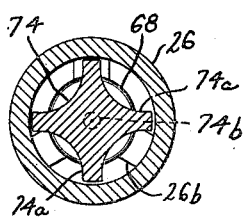
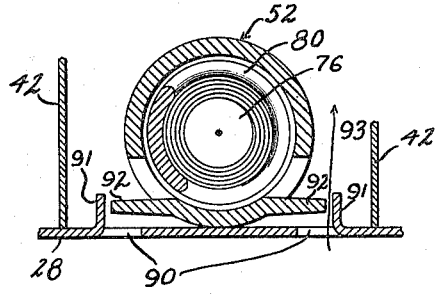
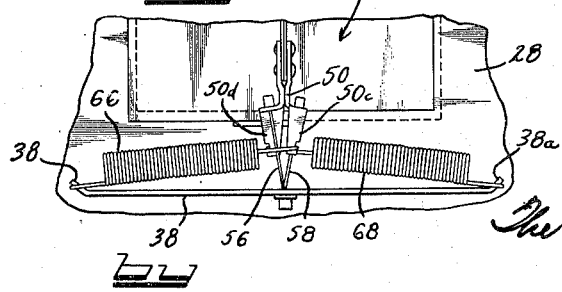
INVENTOR
BRUCE G. COPPING Patented Sept. 26, 1950

2,523,498

UNITED STATES PATENT OFFICE 2,523,498

AUTOMATIC THERMOSTATIC REGISTER

Bruce G. Copping, Atlanta, Ga., assignor to Don Manufacturing Company, Chicago, Ill., a corporation of Illinois Application May 8, 1948, Serial No. 25,837

13 Claims. (Cl. 236—49)

This invention relates to an improvement in automatic registers and more particularly an automatic register of the type intended for use in warm air home heating systems of the type wherein heated air under pressure is supplied to the rooms or spaces heated.

The present subject matter constitutes a continuation-in-part of that disclosed in my copending application Serial No. 708,224, filed November 7, 1946.

In one form of heating system, air under pressure is applied to appropriate ducts which are in communication with a plurality of rooms or spaces to be heated. Each duct is provided with a register to control the quantity of air passing therefrom into the room. These registers each comprise a frame defining an opening leading from the appropriate duct to the room or space and a shutter disposed in this opening to control the quantity of air flow therethrough. Automatic elements operative in response to the room air temperature open and close the shutter to control the quantity of air admitted thereto in such fashion as to maintain constant the temperature therein.

One requirement of an effective automatic register is that the position of the movable shutter be independent of pressure variations in the duct to which it is connected. Such variations are inherent in any practical heating system because the varying air demands necessarily alter the load on the blower and ducts and hence the pressures at the registers. If such pressure changes influence the positions of the shutters, an undesired temperature variation in the spaces or rooms controlled results.

A further requisite of an effective automatic register for use in homes is that it be of simple construction and reliable operation and, moreover, that it be of such inexpensiveness as to fall within the economic ability of the average person.

Still another requirement of an effective and successful automatic register is that the register be capable of manual setting to the desired temperature which may be read from a suitable indicator and shall not deviate substantially from that temperature during normal operations. This provides convenience of operation in that it enables the user to set the temperature desired in a specific space and to then leave the automatic register to maintain that temperature with assurance that no substantial deviations therefrom will occur even though the room demands different quantities of air. This ability is particularly important with respect to changes in outside air temperature which, of course, alter the load on the heating system and hence the opening of the shutters of the various registers.

It is therefore a general object of the present invention to provide an improved automatic register.

Further, it is an object of the present invention to provide an improved automatic register suitable for use in domestic heating.

Yet another object of the present invention is to provide an improved automatic register capable of operating effectively despite variations in pressure within the duct to which it is connected.

Yet another object of the present invention is to provide an improved automatic register which may be calibrated or set at the factory to establish the temperature scale thereof.

Still another object of the present invention is to provide an improved automatic register in which the sensitivity does not vary appreciably over the full range of movement of the shutter.

The novel features which I believe to be characteristic of my invention are set forth with particularity in the appended claims. My invention, itself, however, both as to its organization and method of operation may best be understood by reference to the following description taken in connection with the accompanying drawings in which:

Figure 1 is a front elevational view of the register of the present invention as it appears when mounted on a wall;

Figure 2 is an end elevational view of the register of Figure 1 showing the adjacent wall portions in cross section;

Figure 3 is a front elevational view of the register of Figure 1 with the cover plate removed;

Figure 4 is a view like Figure 3 from below;

Figure 5 is a view of the structure of Figure 4 from the left-hand end;

Figure 6 is a view of the structure of Figure 3 from the rear;

Figure 7 is a cross sectional view through the axis VII—VII, Figure 3;

Figure 8 is a cross sectional view through the axis VIII—VIII, Figure 3;

Figure 9 is a cross sectional view through the axis IX—IX, Figure 3;

Figure 10 is an enlarged fragmentary view of the left-hand edge portion of Figure 4;

Figure 11 is a chart showing the operation of the mechanism of the present invention;

Figure 12 is a view of the structure of Figure 3 from the right hand end;

Figures 13 and 14 are cross sectional views through the axis XIII—XIII and XIV—XIV, Figure 9, respectively;

Figure 15 is a cross sectional view through axis XV—XV, Figure 9 and,

Figure 16 is an enlarged fragmentary cross sectional view through axis XVI—XVI, Figure 3.

Figure 17 is a cross-sectional view through the axis XVII—XVII, Figure 10.

Figure 18 is a side elevation of a modified form of the spacer element used in this invention.

Referring now to the front and side views of Figures 1 and 2, the register of the present invention comprises a housing 20 having a pair of spaced rectangular openings 22 each of which is covered by a plurality of spaced louvers 24. The housing 20 has a rounded portion 20a which projects forwardly as seen in Figure 2 to define a pleasing rounded shape.

A temperature control knob 26 extends from the end of the housing 20 and, as will be described hereafter, may be adjusted to control the flow of air through the openings 22 to maintain predetermined room temperature.

The housing 20 is supported from a back plate 28, Figure 3, by a plurality of screws 30. The back plate 28 has a centrally disposed rectangular opening 32, Figure 3, forming an entrance which defines a passage in conjunction with the openings 22, through which air from a duct 34 passes to the room or space to be heated. A shutter 46 is disposed over the opening 32 and controls passage of air therethrough by appropriate opening and closing movements.

As shown in Figure 2, the housing 20 is supported over the opening of the duct 34 by any suitable means such as, for example, screws extending through openings in the back plate 28 into a supporting wall 36. An edge portion 29 of sponge rubber or the like encircles the back plate 28 as shown in Figure 6 to provide a tight seat against the wall.

As is best seen in the views of Figures 3, 4 and 5, a support plate 38 is mounted on one end of the back plate 28, this support plate having its bottom flange 38c, Figure 4, welded or otherwise attached to the back plate 28. The end portion of the opposite end of the back plate 28 is upturned to form the support plate 40. The toe portions 42a of U-shaped baffle 42 are attached to the support plate 40 to define a chamber in conjunction with the support plate 40 through which air may travel from the duct 34 to the room or space being heated without traveling through the window or opening 32. This air flow produces the aspirator action required to induce air flow through the housing defined by the knob 26 and the temperature control elements disposed therein.

A support rod 44, Figure 3, extends between the baffle 42 and the support plate 38 to take up the pressure therebetween and supplement the framework support provided by the back plate 28.

The shutter 46, Figures 3, 4 and 8, positioned across the window 32 is supported for rotation about an axis through a rib portion 46c by a cord suspension to be described in further detail hereafter.

As is best shown in Figure 8, the shutter 46 is made up of two metal sheets of L-shaped cross section and identified as 46a and 46b, Figure 8. One leg of each of these sheets is spot welded or otherwise attached to the corresponding leg of the other to define the rib 46c which extends the length of the shutter 46. A window, 46d, Figure 4, is provided at one end of this rib and receives the calibrating mechanism shown generally at 48. A tab 50 is attached to the opposite end of the rib 46c.

The shutter 46 overlaps the edges of the opening 32 but bears against the opposite faces of the back plate 28, thereby achieving a neat seating engagement without interfering with rotation.

As will be described in further detail hereafter, the chamber defined by the baffle 42 contains a temperature control assembly indicated generally at 52. This assembly tensions the cord 64, Figure 4, in accord with the temperature in the room or space being heated, the amount of this tension increasing as the temperature of the room air decreases.

The tab 50, Figures 4 and 10, is attached to a cord suspension which operates to sustain the shutter 46 in position and to rotate that shutter in accord with the tension on the cord 64. As will be evident from the greatly enlarged fragmentary view of Figure 10, this suspension includes the cords 56 and 58 which are anchored at their opposite ends to the support plate 38 and the laterally projecting finger portions 50a and 50b of tab 50. The structure of fingers 50a and 50b is also shown in Figure 8. The cords 56 and 58 are preferably made of 21 strand stainless steel aircraft type cable or similar cord having relatively small opposition to bending and twisting. Anchors 60 are press fitted on the opposite ends of the cords 56 and 58 and bottom against suitable openings in the tab 50 and the support plate 38 to anchor the cords 56 and 58 in position. As a means of simplifying the assembly, the anchors 60 located adjacent the support plate 38 bear against suitable openings in a lock plate 62, Figures 5 and 10, and the support plate 38 is provided with a lengthy slot 38d in which the cords 56 and 58 may be inserted. The slot 38d may also be shaped to define an anchor for the reduced end portion of the bar 44 as may be seen in Figure 5.

From Figures 10 and 17, it will be evident that the cords 56 and 58 are spaced in direction perpendicular to the shutter 46 by the lock plate 62 and are spaced in direction parallel to the shutter 46 by the tab 50 which anchors these cords to that shutter. Consequently, the cords 56 and 58 define a twisted surface and, when tensioned, exert torque tending to rotate the shutter 46. Moreover, this torque is in direction to open the shutter 46.

Tension on the cords 56 and 58 is exerted by the cord 64 which is in turn tensioned by the calibrating assembly 48.

A pair of coil springs 66 and 68 extend between the tab 50 and the support plate 38. The spring 68 is attached to the bent-over tab 38a of plate 38 and the spring 66 is hooked over the tab 38b of the plate 38. As is best seen in Figures 5 and 8 the tab 38a is located relatively close to the back plate 28 and the tab 38b is located a relatively further distance therefrom. The springs 66 and 68 are hooked to the extensions 50c and 50d of the fingers 50a and 50b, respectively, of tab 50. These extensions extend in the direction of the axis of rotation of the shutter 46.

As shown in Figure 8, the springs 66 and 68 are connected to the extensions 50c and 50d respectively at points spaced from the axis of the shutter 46 and angularly advanced from a vertical line through the axis and the rib 46c. For the purpose of varying the torque characteristics of the springs, the extensions 50c and 50d may be advanced or retarded angularly with respect to the vertical line through the axis. This may be accomplished in any suitable manner, as by replacing the fingers 50c and 50d with others having a configuration to give the desired characteristics or the fingers could be mounted on a member pivotable about the axis of the shutter.

From the figures it will be evident that the springs 66 and 68 exert torque tending to rotate the shutter 46 in direction opposite the direction of rotation associated with the torque caused by tensioning the cords 56 and 58. Thus, the springs 66 and 68 act to close the shutter 46 against the torque of cords 56 and 58 and tend to hold the shutter in the closed position shown in Figures 6 and 8.

The elements contained within the housing 52, Figure 3, and the temperature control knob 26 are seen best in Figure 9, which is a cross-sectional view through the axis IX—IX, Figure 3. The housing 52 is of die cast construction and is of generally cylindrical shape with a wall 52a in abutting relationship with the baffle plate 42. At the end opposite the wall 52a, the interior of housing 52 is threaded as indicated at 52b and terminates in an annular lip 52c which surrounds the temperature adjusting knob 26.

The temperature adjusting knob 26 is of molded plastic construction and at one end bears threads 26a which are received in threaded engagement by the threads 52b of the housing 52 to sustain the temperature control knob and to permit adjustment of the position thereof relative to housing 52. At the end opposite threads 26a, the temperature adjusting knob 26 terminates in a plurality of inwardly extending ribs 26b which may also be seen in end view in Figure 2. These ribs engage the wall defined by an enlarged portion 68a of a temperature sensitive element 68 and terminate in radii corresponding to the radius of a reduced end portion 68b of that element. This forms a snug seat against which the element 68 bottoms.

Open spaces 70, Figures 2 and 12, are formed between the adjacent ribs 26b. These spaces define passages for air flow through the temperature adjusting knob 26 as indicated by the arrow 72, Figure 9.

The spacer 74 comprises a generally cylindrical rod of molded plastic material such as, for example, "bakelite" or other phenol formaldehyde condensation product and terminates in a wing portion defined by a plurality of spaced radially extending ribs 74a which engage the interior of the temperature control knob 26 to sustain the spacer 74 therein during assembly. This is best seen in the view of Figure 15. The winged end portion of spacer 74 further has a recess 74b, Figures 9 and 15, to receive a piston 68c of the temperature sensitive element 68.

At the end opposite ribs 74a, the spacer 74 has a cavity 74c, Figure 9. Moreover, a cap 76 fits over this end of spacer 74 and about the cavity 74c. This cap is of drawn metal construction and is cup-shaped with a centrally disposed opening through which the cord 64 passes. A tab 78 is press-fitted on the end of cord 64 and bottoms against the cap 76 to hold that end of cord 64 firmly against the cap. The cavity 74c is of sufficient size freely to receive the tab 78. A modified form of spacer member 74 which has ribs 74a adjacent each end is shown in Figure 18.

Skirt or edge portions 76a are bent over to define an annular wall against which the small end of a compression spring 80 bottoms. The large end of this spring bottoms against the wall 52a of the housing 52 and thus urges the cap 76, the spacer 74, and the temperature sensitive element 68 against the ribs 26b of the temperature control knob 26. This action of spring 80 holds the elements within the housing 52 and the temperature control knob 26 snugly in place and, moreover, tensions cord 64 in accord with the differential between the force exerted by the temperature sensitive element 68 and the compressive force of spring 80.

As is best seen in Figure 7, the baffle 42 has a keyhole slot 43 which has an enlarged portion capable of receiving the sleeve 82 to permit simple disassembly of the structure.

Temperature sensitive element 68 may be any one of various devices which undergo a change in length with temperature. Preferably this element is of the so-called "vernet" type wherein a change in volume of a material during its transformation from one physical state to another in response to temperature variation is utilized to effect the movements of a control element. It is, of course, a well known fact that a change in volume takes place in most materials when the material changes from a solid to a liquid state or from a liquid to a gaseous state and these elements utilize such volume changes to effect a change in the length thereof throughout a predetermined temperature range. In the specific type of "vernet" element shown in the drawings, Figure 9, the piston 68c moves outward, or to the left in Figure 9, with increasing temperature, and inward with decreasing temperature.

The end of cord 64 opposite the end to which tab 78 is fitted is attached to the rib portion 46c of the shutter 46 by the calibrating assembly 48. This assembly includes a collar 82 of brass or similar material having a central opening to receive the cord 64 and which is slotted to receive the rib 46c of the shutter 46 in the region adjacent the extended slot portion 46e of the window 46d. The construction of this collar is best seen in the cross sectional view of Figure 14. A tab 84 is press fitted to the end of cord 64 and bottoms against the end of the collar 82. The end of collar 82 adjacent the tab 84 is threaded and receives the nut 86 in threaded engagement. This nut bottoms against the edge of the window 46d to sustain the entire assembly including collar 82, tab 84, and cord 64 in fixed relationship to the rib 46c.

Operation of the register of the present invention will be apparent from the foregoing description. Air under pressure in duct 34, Figure 2, travels through the opening into the chamber defined by the baffle 42, and thereby induces air currents following the arrow 72, Figure 9, through the temperature adjusting knob 26 and the housing 52. These air currents cause the temperature sensitive element 68 to partake of the average air temperature in the room or space being heated. If this air temperature falls below the temperature at which the knob 26 is set, the piston 68c of the sensitive element 68 moves inward (to the right in Figure 9), thereby permitting the entire assembly including spacer 74, cap 76 and the end of spring 80 to extend in the right-hand direction, Figure 9. This tensions the cord 64 and imparts corresponding tension to the cords 56 and 58, thereby imparting torque to the shutter 46 and causing the latter to rotate in direction to permit more air flow from the duct 34 through the louvers 22. This opening operation will continue until the position of the shutter 46 is such that the heat carried by the air entering the room is equal to the heat lost therefrom at the temperature desired.

If the temperature of the room air rises above the set temperature, the piston 68c moves outward and the shutter 46 closes.

The function of the calibrating assembly 48 is to permit adjustment of the shutter 46 at a preselected position of the temperature control knob 26. The latter includes a dial plate 88 bearing a series of temperature numbers for registry with the pointer 52d which is formed in the housing 52 and may be seen in Figures 1 and 2. It is, of course, substantially impossible to manufacture a precision instrument such as the register of the present invention in mass production without encountering substantial variations between individual units insofar as the temperature calibration is concerned. To attempt to overcome this problem by the use of more accurate springs 80, 66 and 68, together with closer dimensional tolerances, is uneconomical and would increase the shutter cost of the unit beyond the justifiable cost.

The calibrating assembly 48 overcomes this problem since adjustment of nuts 86 relative to the collar 82 until the shutter 46 is held in the closed position when the element 68 is at the temperature corresponding to the setting of the dial 88 provides the desired calibration irrespective of variations in the characteristics of the component parts of the mechanism. This is an extremely simple operation in mass production, for it is merely necessary to provide a thermometer indicating the temperature of the room, and hence the temperature of the element 68, and the dial 88 may be merely set to that temperature and the nut 86 adjusted until shutter 46 just commences to open. No close dimensional tolerances, and no accurately predetermined temperatures are required. When this adjustment has been made a drop of cement may be placed on the portion of the nut 86 adjacent the collar 82 to prevent loss of calibration due to vibrations and shocks incident to shipping.

The back plate 28 has a pair of spaced openings 90, Figure 6, formed by bending tabs upwardly into the chamber defined by the baffle 42. These openings are in registry with a pair of tabs 92 formed in the housing 52. Air traveling through the openings 90 as indicated by arrow 93, Figure 16, induces a low pressure area adjacent the openings 92 by reason of aspirator action, thereby drawing air through the openings 70 in control knob 26, Figure 12 and causing the element 68 to partake of the average air temperature within the room or space heated.

The amount of motion of the piston 68c of the temperature sensitive element 68 per degree of temperature change is affected by variations in the pressure against which the piston is working. If the reacting pressure increases as the piston moves outward, then the amount of travel per degree of temperature change is lessened. Conversely, if the piston moves out against a decreasing resistance, then the amount of travel per degree of temperature change is increased.

As the temperature falls, the reacting spring pressure forces the piston back. If this returning pressure decreases as the piston backs in, then the amount of backward motion per degree of temperature drop is lessened. If, on the other hand, the returning pressure increases as the piston backs up, then the amount of backward motion per degree of temperature drop is increased. Thus, for maximum motion of the piston, both outward and inward, the pressure against which the piston is working should be least in the outward position and greatest in the inward position.

The springs 66 and 68 exert a torque on the shutter 46, and through the action of the cords 56 and 58 this torque is translated into tension on the cord 64, which tension opposes the force of the spring 80. Thus, the net pressure against the piston 68c is the pressure of the spring 80, minus the tension on the cord 64 resulting from the torque of the springs 66 and 68.

The torque exerted on the shutter 46 by each spring 66 and 68 is the pull of the spring, multiplied by the distance from the line of pull of the spring to the axis of rotation of the shutter, this distance being measured at right angles to the line of pull of the spring. As is best shown in Figure 8, when the shutter 46 is in the closed position, the points of attachment of the springs 66 and 68 to the tab 50 do not lie on a line perpendicular to the back plate 28, but rather are on a line which is advanced a considerable angle in the direction of rotation of the shutter 46 when opening. Thus, as the shutter 46 opens, the pull of the springs 66 and 68 increases due to their greater extension, but at the same time the distance from the line of pull to the axis of rotation decreases. The greater the angle of advance of the attachment points on the tab 50, the more rapidly this distance decreases; and if sufficient angle of advance exists as the shutter 46 opens, the decrease of distance from line of pull to axis of rotation will more than offset the increase in pull of the springs 66 and 68, and the torque, which is the product of the pull and the distance, will decrease as the shutter 46 opens.

This decreasing torque is translated in a decreasing tension on the cord 64 and may be made to decrease at a rate sufficient to more than offset the natural increase which occurs in the spring 80 as the shutter 46 opens, and thus provide the desired reduction of reacting pressure against the piston 68c as it moves out.

Figure 11 illustrates for a practical case this relationship between the forces exerted by the springs 80 and 66 and 68 upon the cord 64, and shows the net effect of these opposing forces. In Figure 11, any force tending to pull the cord 64 to the right, as seen in Figure 9, is taken as a positive or "plus" force. Any force to the left is a negative or minus force. Thus, curve A shows the positive force due to spring 80 and shows how this force is least when the shutter 46 is open, and increases as the shutter 46 closes, and the spring 80 is compressed until maximum force occurs at the full closed position.

Curve B shows the force applied to the cord 64 through the action of the return springs 66 and 68. This is a minus force, and by providing a suitable angle of advance of the points of attachment of the springs 66 and 68 to the tab 50, this force is made to be at a maximum when the shutter 46 is full closed and at a minimum when the shutter 46 is full open.

The net reaction against the piston 68c is the algebraic sum of the forces due to the spring 80 and those due to the springs 66 and 68. Curve C shows this next reaction, which is a positive force, and which is at a minimum of 18 pounds at closed position and increases to a maximum of 22 pounds at full open position, which is the desired characteristic of the force reacting against the piston 68c.

While, in the particular example cited, it is desirable to have the net reaction increase approximately four pounds as the shutter 46 opens, other applications might require a different slope in curve C. By suitable manipulation of the angle of advance of the attachment points of the springs 66 and 68 to the tab 50, and by proper changes in the characteristics of the springs 66 and 68 and 80, the curve C may be made of any desired shape.

In an actual automatic thermostatically controlled shutter built in accordance with the principles of the present invention the marks on the dial 88 of knob 26 are spaced approximately three-eights of an inch and represent 2½° F. difference in room temperature. This variation in room temperature corresponds to approximately .014 inch of travel of the member 74 and corresponding movements of the cord 64. This movement is sufficient to rotate the shutter 46 through an angle of approximately 45° and moves the tip of the shutter blade approximately an inch and one-half. Thus an original motion of .014 inch is converted into actual shutter opening motion of one and one-half inches or one hundred times as much motion as the thermostatically controlled element itself is capable of making. This tremendous step-up in motion, achieved without substantial frictional losses, accounts for the unusual effectiveness of the shutter of the present invention. Moreover, to get a similar multiplication of motion by gears or other conventional mechanism without back lash and lost motion would require precision machinery that would render the cost of the ventilator prohibitive.

While I have shown a particular embodiment of my invention, it will, of course, be understood that I do not wish to be limited thereto since many modifications, both in the elements employed and in their cooperative structure, may be made without departing from the spirit and scope of my invention. I, of course, contemplate by the appended claims to cover all such changes and modifications as fall within the true spirit and scope of my invention.

What I claim as new and desire to secure by Letters Patent in the United States is:

1. In combination, a housing defining a fluid passage, a rotatable shutter in control of the flow through said passage, suspension cords extending between one end of said shutter and said housing and being twisted so as to torsionally load the shutter, and a tensioning cord on the other end of said shutter for translating variable tensions to said suspension cords and thereby control rotation of said shutter.

2. The combination of claim 1 further characterized by the provision of a tensioning spring for applying a predetermined quantitative value of longitudinally axial force to the shutter to offset the dynamic effect of the torsional stress imparted thereto, whereby a static condition of equilibrium will be produced wherein the shutter will assume a predetermined angular position within the passage.

3. The combination of claim 1 further characterized by the provision of spring means for applying a predetermined torsional force to the shutter to offset the initial torsional load on the shutter.

4. The combination of claim 1, further characterized by the provision of a thermostat for delivering variable longitudinal loads to the tensioning cord in response to temperature variations, whereby the position of the shutter may be thermostatically controlled.

5. The combination of claim 1 further characterized by the provision of a tensioning spring for applying a predetermined quantitative value of longitudinally axial force to the shutter to offset the dynamic effect of the torsional stress imparted thereto, whereby a static condition of equilibrium will be produced wherein the shutter will assume a predetermined angular position within the passage and adjusting means cooperable with the tensioning spring to adjustably and selectively vary the force exerted by the tensioning spring, whereby different range limits of equilibrium may be selectively established.

6. An air flow controller comprising a housing defining an air passage, a displaceable shutter in control of the air flow through said air passage, twisted suspension means between the housing and the shutter to rotatively suspend the shutter in the air passage and torsionally stress the shutter in a given angular direction toward a predetermined position of displacement and linearly displaceable means connected to the suspension means to selectively vary the twist of said suspension means.

7. In an air flow controller, a housing defining an air passage, a rotatable shutter in control of the air flow through said passage, suspension members extending between the shutter and the housing and being twisted so as to torsionally load the shutter, and tensioning means connected to the suspension members for controlling rotation of the shutter by variably tensioning the suspension members to change the torsional load on the shutter.

8. An air flow controller according to claim 7 and further characterized by the provision of resilient means for applying an initial torsional force to the suspension means whereby the shutter will be substantially torsionally balanced.

9. An air flow controller according to claim 8 and further characterized by the provision of a tensioning spring for applying a longitudinally axial force to the suspension means to establish a condition of equilibrium wherein the shutter will assume a predetermined angular position within the air passage.

10. An air flow controller according to claim 9 and further characterized by the provision of a thermostat cooperatively related with said tensioning means and operable to deliver variable longitudinal loads thereto in response to temperature variations, whereby the position of the shutter may be thermostatically controlled.

11. In an air flow controller, a housing defining an air passage, a rotatable shutter in control of the air flow through said passage, suspension members extending between the shutter and the housing and being twisted so as to torsionally load the shutter, tensioning means connected to the suspension members for controlling rotation of the shutter by variably tensioning the suspension members to change the torsional load on the shutter and adjustable means cooperable with the tensioning means to adjustably and selectively vary the forces exerted thereby for selectively establishing different operating range limits.

12. In combination, an angularly displaceable element, supporting means for suspending said element and including a resilient torsional means biasing said element toward a first position, means for overcoming said bias to move said element toward a second position and thermostatically operated means for applying force in an axial direction to said torsional means for varying said torsional means to change the resilient loading of said element, said thermostatic means including a member comprising a confined mass of matter changeable in volume in response to a temperature change to apply movement transversely to said element.

13. In combination, an angularly displaceable element, supporting means suspending said element and including a resilient torsional means biasing said element toward a first position, means for overcoming said bias to move said element toward a second position and thermostatically operated means for applying force in axial direction to said torsional means for varying said torsional means to change the resilient loading of said element, said thermostatic means comprising a longitudinally disposed member and a tube therearound defining an air passage for controlling the air through which the thermostatic member is subjected.

BRUCE G. COPPING.

REFERENCES CITED

The following references are of record in the file of this patent:

UNITED STATES PATENTS

| Number | Name | Date |
| --- | --- | --- |
| 1,186,180 | Fulton | June 6, 1916 |
| 1,561,425 | Fernandez | Nov. 10, 1925 |
| 1,833,950 | Modine | Dec. 1, 1931 |
| 2,011,546 | Waltenberg | Aug. 13, 1935 |
| 2,067,629 | Flagg | Jan. 12, 1937 |
| 2,234,840 | Geis | Mar. 11, 1941 |
| 2,241,108 | Akers | May 6, 1941 |